United States Patent
Jeong et al.

(10) Patent No.: US 9,804,660 B2
(45) Date of Patent: Oct. 31, 2017

(54) DATA STORAGE DEVICE, METHOD THEREOF, AND DATA PROCESSING SYSTEM INCLUDING THE SAME

(71) Applicants: Tae Min Jeong, Seoul (KR); Hyun Wook Lee, Gimcheon-si (KR); Jae Chun Park, Seongnam-si (KR); Soon Jae Won, Yongin-si (KR)

(72) Inventors: Tae Min Jeong, Seoul (KR); Hyun Wook Lee, Gimcheon-si (KR); Jae Chun Park, Seongnam-si (KR); Soon Jae Won, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 113 days.

(21) Appl. No.: 14/614,492

(22) Filed: Feb. 5, 2015

(65) Prior Publication Data
US 2015/0227187 A1 Aug. 13, 2015

(30) Foreign Application Priority Data

Feb. 13, 2014 (KR) .......................... 10-2014-0016380

(51) Int. Cl.
G06F 1/32 (2006.01)
(52) U.S. Cl.
CPC ............ *G06F 1/325* (2013.01); *G06F 1/3203* (2013.01); *G06F 1/3206* (2013.01); *G06F 1/3287* (2013.01); *Y02B 60/1282* (2013.01); *Y02B 60/32* (2013.01)
(58) Field of Classification Search
CPC .... G06F 1/3203; G06F 1/3206; G06F 1/3287; G06F 1/325

USPC .................................. 713/320, 323; 365/226
See application file for complete search history.

(56) References Cited

U.S. PATENT DOCUMENTS

| | | | |
|---|---|---|---|
| 7,003,277 B2 * | 2/2006 | Toshida | H04W 52/029 455/127.1 |
| 7,178,045 B2 | 2/2007 | Puffer et al. | |
| 7,352,248 B2 | 4/2008 | Meltzer et al. | |
| 7,467,308 B2 | 12/2008 | Chang et al. | |
| 7,539,883 B2 | 5/2009 | Kojou et al. | |
| 7,607,029 B2 | 10/2009 | Tseng et al. | |
| 7,752,473 B1 | 7/2010 | Kwa et al. | |
| 8,286,017 B2 | 10/2012 | Lo | |
| 8,607,075 B2 | 12/2013 | Gough et al. | |
| 8,631,257 B2 | 1/2014 | Jeyaseelan et al. | |
| 8,719,485 B2 * | 5/2014 | Sutardja | G06F 3/0658 710/313 |
| 9,229,525 B2 * | 1/2016 | Reller | G06F 1/3253 |
| 2002/0083239 A1 * | 6/2002 | Iida | G06F 3/0625 710/74 |
| 2009/0193243 A1 * | 7/2009 | Ely | G06F 1/3203 713/2 |

(Continued)

*Primary Examiner* — Chun Cao
(74) *Attorney, Agent, or Firm* — Harness, Dickey & Pierce, P.L.C.

(57) ABSTRACT

A data storage device includes a central processing unit (CPU); a peripheral device; a power management unit (PMU) configured to control a power supply to the CPU and the peripheral device; and a receiver configured to transmit a second signal to the PMU through a second transmission path after transmitting a first signal to the CPU through a first transmission path, the receiver being configured such that the first and second signals transmitted by the receiver are signals that were output from a host.

15 Claims, 9 Drawing Sheets

(56) References Cited

U.S. PATENT DOCUMENTS

| | | | |
|---|---|---|---|
| 2010/0017556 A1* | 1/2010 | Chin | G06F 12/0246 711/103 |
| 2012/0191887 A1 | 7/2012 | Yamauchi et al. | |
| 2012/0331199 A1 | 12/2012 | Hayashi | |
| 2013/0159785 A1* | 6/2013 | Hashimoto | G06F 11/004 714/47.2 |
| 2014/0019788 A1 | 1/2014 | Fang et al. | |
| 2014/0113690 A1* | 4/2014 | Shanmugasundaram | H04W 52/0225 455/574 |
| 2014/0281627 A1* | 9/2014 | Stenfort | G06F 21/74 713/323 |
| 2015/0178009 A1* | 6/2015 | Shin | G06F 12/0246 711/103 |

* cited by examiner

FIG. 6

| DCODE | PW1 | PW2 | PW3 | ... | PWn |
|---|---|---|---|---|---|
| CODE1 | ON | ON | OFF | ... | OFF |
| CODE2 | OFF | ON | ON | ... | OFF |
| CODE3 | OFF | ON | ON | ... | ON |
| ⋮ | ⋮ | ⋮ | ⋮ | ... | ⋮ |
| CODEn | OFF | ON | OFF | ... | ON |

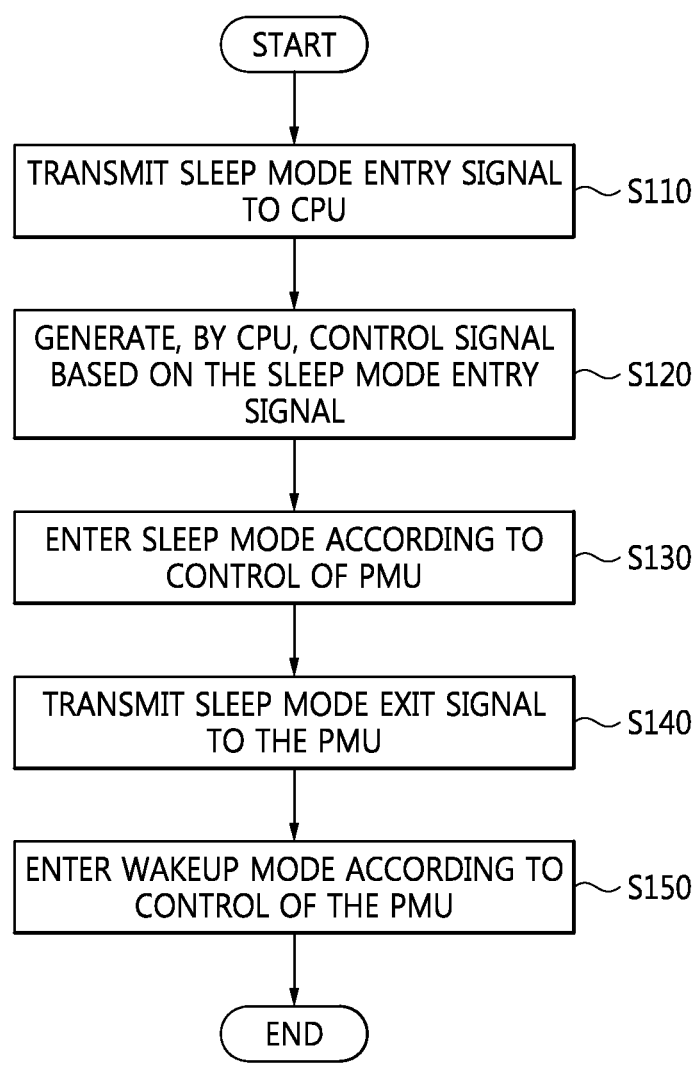

DATA STORAGE DEVICE, METHOD THEREOF, AND DATA PROCESSING SYSTEM INCLUDING THE SAME

CROSS-REFERENCE TO RELATED APPLICATIONS

This application claims priority under 35 U.S.C. §119(a) from Korean Patent Application No. 10-2014-0016380 filed on Feb. 13, 2014, the disclosure of which is hereby incorporated by reference in its entirety.

BACKGROUND

One or more example embodiments of the inventive concepts relate to a data storage device, and more particularly to a data storage device which may control a power supplied to other interfaces based on a signal input through one of two types of interfaces, an operating method thereof, and a data processing system including the same.

Peripheral component interconnect (PCI) express (PCIe) is an interface of a serial structure for an input/output set by the PCI Special interest. Group (PCI-SIG) in 2002, and is made mainly by Intel. New L1 PM sub-states in the PCIe can be applied to an active state power management (ASPM) and PCI power management (PCI-PM) L1 link states. The L1 PM sub-state management uses a per-link sideband signal referred to as CLKREQ#.

When data are not actually transmitted through a PCIe interface connected between a plurality of PCIe devices, the PCIe interface enters a power saving mode using L1 PM sub-states. In some systems, in order to use L1 PM sub-states, CLKREQ# has to be used. However, in a legacy system in which the CLKREQ# may not be used, it may not be possible to use the L1 PM sub-states.

SUMMARY

One or more example embodiments provide a data storage device which may perform a power saving mode corresponding to L1 PM sub-states using an additional interface in a PCIe interface legacy system in which a per-link sideband signal referred to as CLKREQ# may not be used, an operation method thereof, and a data processing system including the same.

One or more example embodiments of the inventive concepts provide a data storage device including a central processing unit (CPU); a peripheral device; a power management unit (PMU) configured to control a power supply to the CPU and the peripheral device; and a receiver configured to transmit a second signal to the PMU through a second transmission path after transmitting a first signal to the CPU through a first transmission path, the receiver being configured such that the first and second signals transmitted by the receiver are signals that were output from a host.

The CPU may be configured to transmit a control signal, the control signal being a signal generated based on the first signal, and the CPU may be configured to intercept power supplied to the CPU and the peripheral device in response to the control signal.

The receiver may be included in one of a universal asynchronous receiver/transmitter (UART), a system management bus (SMBus), and a general purpose input output (GPIO) device, and the peripheral device may be a high-speed serial interface.

The high-speed serial interface nay be a peripheral component interconnect express (PCIe) interface.

The PMU may be configured to determine whether or not to supply power to at least one of the CPU and the peripheral device based on the second signal and a value stored in a register of the PMU.

The PMU may be configured to determine whether or not to supply power to at least one of the CPU and the peripheral device based a change in a first edge of a waveform of the second signal and a value stored in the register of the PMU.

The PMU may be configured to decode the second signal and the PMU may be configured to determine whether or not to supply power to at least one of the CPU and the peripheral device based on the decoded signal and a value stored in the register of the PMU.

One or more example embodiments of the inventive concepts provide a data processing system comprising: a host; a data storage device; a first interface connected between the host and the data storage device; and a second interface connected between the host and the data storage device, wherein the data storage device is configured to enter an idle state, and the data storage device is configured to control the second interface such that a state of the second interface is a power-off state based on a first data packet, the first data packet being a data packet which is output from the host and input through the first interface, and the data storage device is configured such that the data storage device transitions from the idle state to an active state, and the data storage device is configured to control the second interface such the state of the second interface is a power-on state based on a second data packet, the second data packet being a data packet which is output from the host and input through the first interface.

The first interface may be one of a universal asynchronous receiver/transmitter (UART), a system management bus (SMBus), and a general purpose input output (GPIO) device, and the second interface is a peripheral component interconnect express (PCIe) interface.

The data storage device may include a CPU; a peripheral device; a power management unit (PMU) configured to control a power supply to the CPU and the peripheral device; and a receiver configured to transmit the second data packet to the PMU after transmitting the first data packet to the CPU.

The CPU may be configured to transmit a control signal to the PMU, and the PMU may be configured to intercept power supplied to the CPU and the peripheral device in response to the control signal, the control signal transmitted by the CPU being generated based on the first data packet.

The PMU may be configured to determine whether or not to supply power to at least one of the CPU and the peripheral device based on the second data packet and a value stored in the register of the PMU.

The PMU may be configured to determine whether or not to supply power to at least one of the CPU and the peripheral device based on a change in a first edge of a waveform of the second data packet and a value stored in the register of the PMU.

The PMU may be configured to decode the second data packet, and the PMU may be configured to determine whether or not to supply power to at least one of the CPU and the peripheral device based on a decoded signal and a value stored in the register of the PMU.

One or more example embodiments provide a data processing system including a host; a data storage device; a first interface connected between the host and the data storage device; and a second interface connected between the host and the data storage device, the data storage device being configured to receive a first signal from the host through the first interface, the data storage device being configured such that, based on receiving the first signal, the data storage device controls the second interface to transition from a power-on state to a lower power state, the lower power state being a state in which the second interface uses less power than the power-on state, the data storage device being configured to receive a second signal from the host through the first interface, the data storage device being configured such that, based on receiving the second signal, the data storage device controls the second interface to transition from the lower power state to the power-on state.

The first signal may not a sideband CLKREQ# signal.

One or more example embodiments of the inventive concepts is directed to a method of operating a data storage device connected to a first interface and a second interface, including transmitting a sleep mode entry signal input through the first interface to a CPU, generating, by the CPU, a control signal corresponding to the sleep mode entry signal, intercepting, by a PMU, power supplied to the CPU and a second interface, directly transmitting a sleep mode exit signal input through the first interface to the PMU, and determining, by the PMU, whether or not to supply again the power to at least one of the CPU and the second interface based on the sleep mode exit signal.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 6 is a table for describing an operation of the power management unit illustrated in FIG. 1A or 1B;

FIG. 8 is a flowchart for describing an operation of the data processing system illustrated in FIG. 1A or 1B.

DETAILED DESCRIPTION OF THE EMBODIMENTS

Figure 1A:
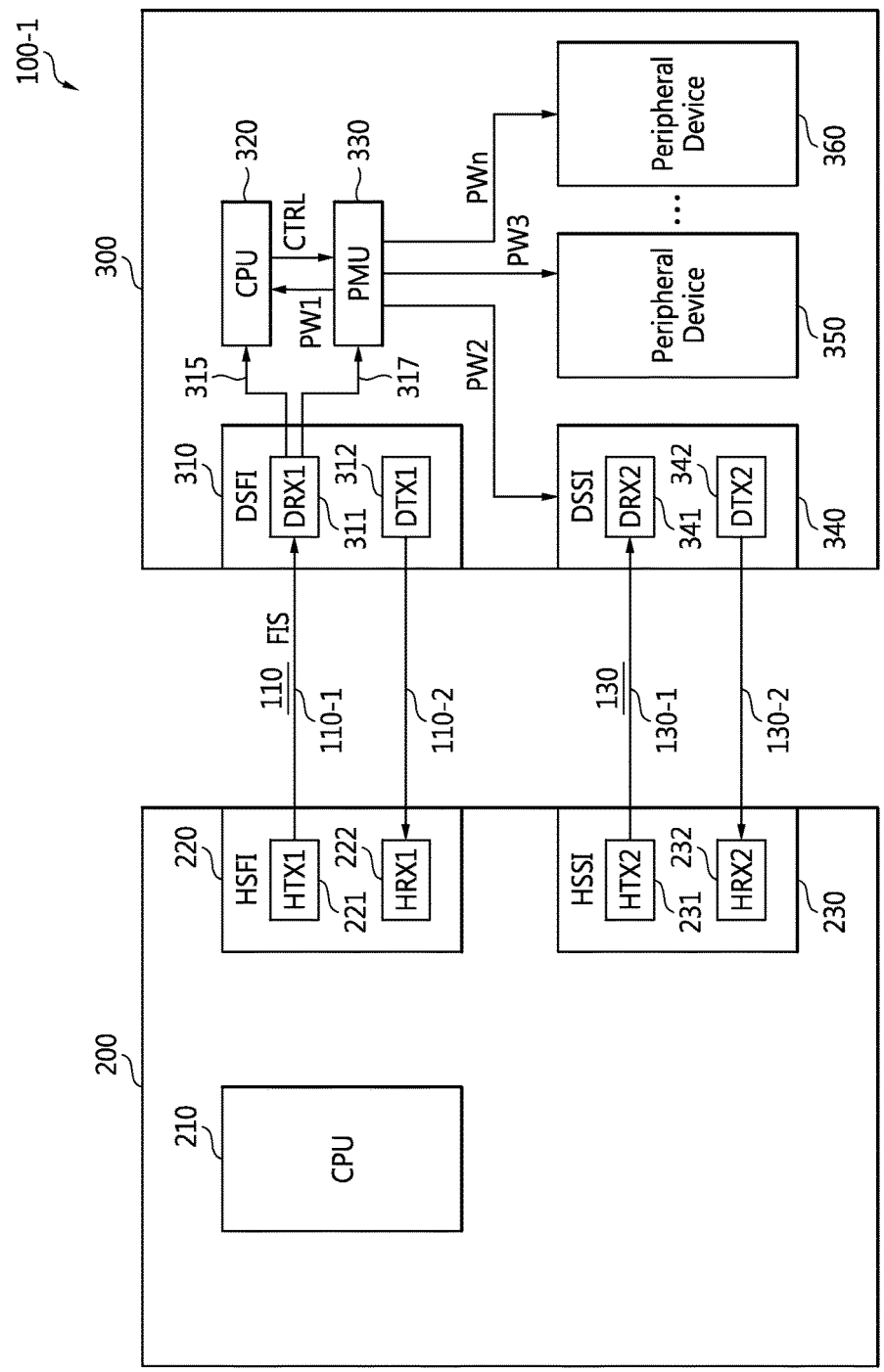
FIG. 1A is a block diagram of an example of a data processing system according to one or more example embodiments of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1A is a block diagram of an example of a data processing system according to one or more example embodiments of the inventive concepts. Referring to FIG. 1A, a data processing system 100-1 includes a host 200 and a data storage device 300.

The data processing system 100-1 may be embodied, for example, in a personal computer (PC), a data server, a network-attached storage (NAS), a data center, an internet data center, or a portable electronic device. The portable electronic device may be embodied, for example, in a laptop computer, a smart phone, a tablet PC, a mobile internet device (MID), an internet of things (IoT) device, an internet of everything (IoE) device, or a wearable device.

For example, the data processing system 100-1 may be, include or be included in a main board or motherboard.

The host 200 may be embodied, for example, in an integrated circuit, a system on chip (SoC), an application processor (AP), or a mobile AP. The host 200 and the data storage device 300 may transmit or receive an instruction and/or data through two types of interfaces 110 and 130.

The host 200 may include a central processing unit (CPU) 210, a host side first interface (HSFI) 220, and a host side second interface (HSSI) 230. The HSFI 220 includes a transmitter 221 and a receiver 222. For example, each of the transmitter 221 and the receiver 222 may be embodied in a structure that transmits differential signals.

According to one or more example embodiments of the inventive concepts, the HSFI 220 may be embodied in a universal asynchronous receiver/transmitter (UART), a system management bus (SMBus), or a general purpose input output (GPIO). Accordingly, a first interface 110 may transmit or receive signals related to the UART, signals related to the SMBus, or signals related to the GPIO.

The transmitter 221 of the HSFI 220 may transmit a first interface signal FIS which may control an operation state of the data storage device 300 to the data storage device 300 through a signal transmission line 110-1. The first interface signal FIS includes a first signal or a second signal. For example, the signal transmission line 110-1 may be embodied in a cable. Examples of each of the first signal and the second signal include a data packet or a data pattern.

For example, the data storage device 300 may perform an entry into a power saving mode in response to the first signal, and perform an exit from the power saving mode in response to the second signal.

The receiver 222 may receive one or more signals transmitted from the data storage device 300 through a signal receiving line 110-2.

The HSSI 230 includes the transmitter 231 and the receiver 232. For example, each of the transmitter 231 and the receiver 232 may be embodied in a structure of transmitting differential signals. The HSSI 230 may transmit or receive an instruction and/or data to or from a device side second interface (DSSI) 340 through signal lines 130-1 and 130-2 included in the second interface 130.

For example, the second interface 130 may be embodied in a high-speed serial interface. According to one or more example embodiments of the inventive concepts, the second interface 130 may be embodied in a peripheral component interconnect express (PCIe) interface. For example, the second interface 130 may be referred to as a link.

Figure 1B:
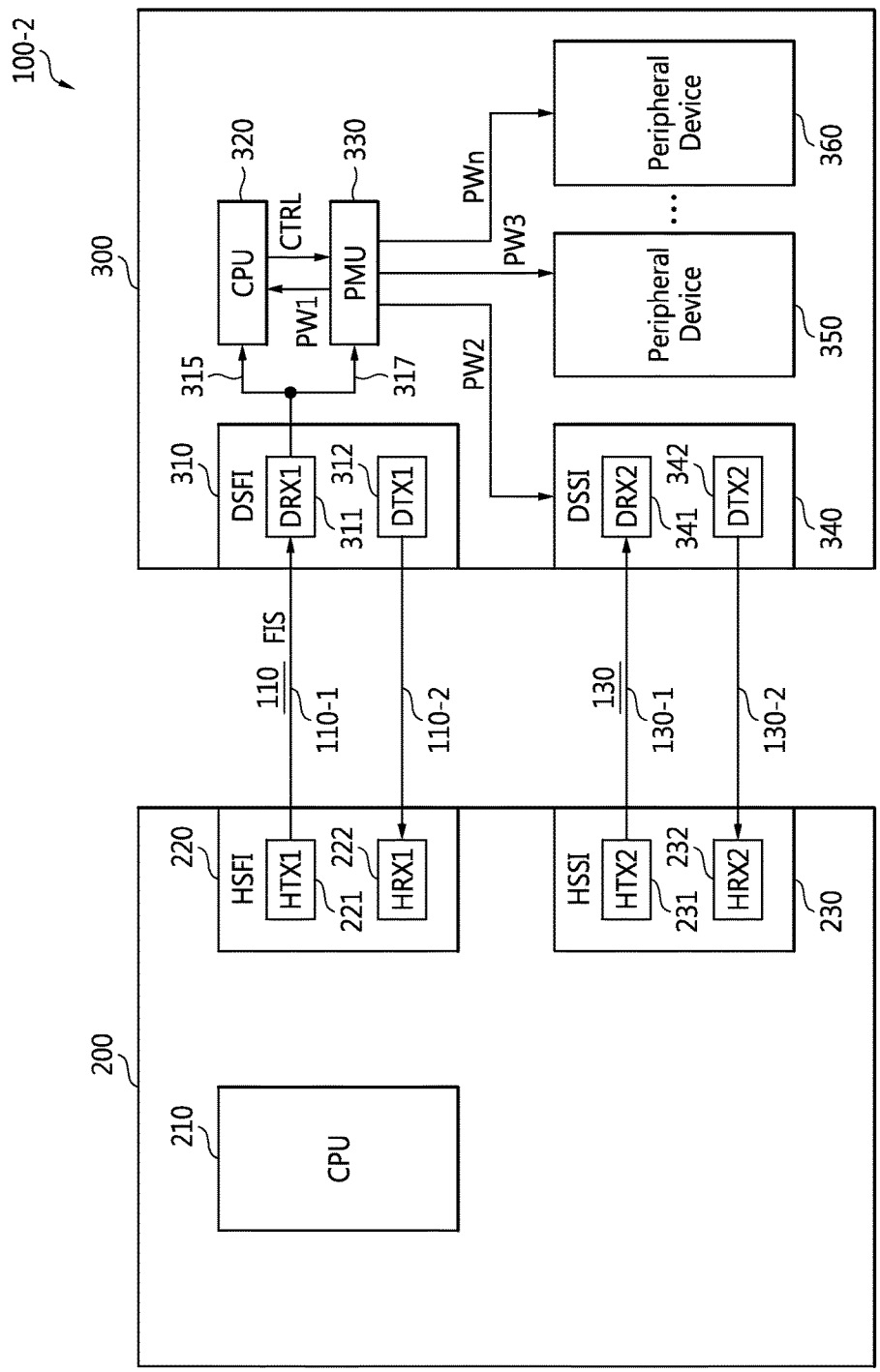
FIG. 1B is a block diagram of another example data processing system according to one or more example embodiments of the inventive concepts.

For convenience of description in FIG. 1A or 1B, a link 130 including one lane, e.g., a PCIe link, is illustrated. However, according to one or more example embodiments, the number of lanes included in the link 130 may be, for example, 2, 4, 8, 12, 16, or 32. At this time, the number of transmitters/receivers included in the HSSI 220 and the number of transmitters/receivers included in the DSSI 340 may be changed according to the number of lanes.

The data storage device 300 may include a device side first interface (DSFI) 310, a CPU 320, a power management unit (PMU) 330, and one or more peripheral devices 340, 350, and 360. According to one or more example embodiments of the inventive concepts, the DSFI 310, the CPU 320, the PMU 330, and the peripheral device 340 may perform a function of a controller which controls an operation of the peripheral devices 350 and 360. According to ne one more example embodiments, the controller may be embodied in a SoC.

The device side second interface DSSI 340 may be referred to as a peripheral device. For example, the data storage device 300 may be embodied in a flash-based memory device which supports PCIe. The flash-based memory device may be embodied in a solid state drive (SSD), a universal flash storage (UFS), a multimedia card (MMC), or an embedded MMC (eMMC).

An example of the data storage device 300 is illustrated as a PCIe device. Further, the PCIe device may be embodied in, for example, a graphic card or a LAN card. Thus, according to one or more example embodiments, the structure and/or operations described herein with respect to the data storage device 300 may apply to any PCIe device including, for example, a graphic card or LAN card.

The DSFI 310 may transmit or receive an instruction and/or data to or from the HSFI 220 through the first interface 110. The DSFI 310 includes a receiver 311 and a transmitter 312. For example, each of the receiver 311 and the transmitter 312 may be embodied in a structure of transmitting differential signals.

FIG. 1B is a block diagram of another example data processing system according to one or more example embodiments of the inventive concepts. Except for a structure of paths through which signals output from the DSFI 310 are transmitted to the CPU 320 and the PMU 330, a structure and an operation of the data processing system 100-1 illustrated in FIG. 1A are substantially the same as a structure and an operation of a data processing system 100-2 illustrated in FIG. 1B.

Figure 2:
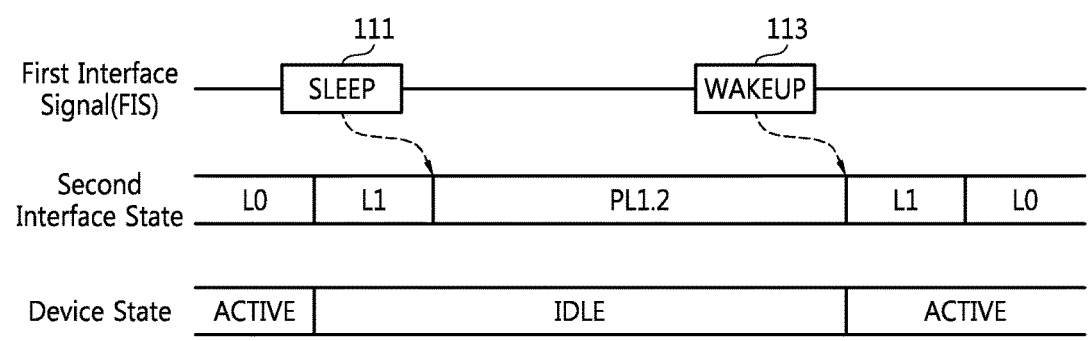
FIG. 2 is a timing diagram for describing an operation of the data processing system illustrated in FIG. 1A or 1B.

FIG. 2 is a timing diagram for describing an operation of the data processing system illustrated in FIG. 1A or 1B. Referring to FIGS. 1A, 1B, and 2, when a state of the data storage device 300 is an active state and a state of the second interface 130 is an L0 state, the PMU 330 may supply each power PW1, PW2, PW3, and PWn to each of the peripheral devices 340, 350, and 360 and the CPU 320 according to a control of the CPU 320. Accordingly, in an L0 state, the HSSI 230 of the host 200 and the DSSI 340 of the data storage device 300 may transmit or receive data to or from each other through the second interface 130.

When the transmitter 221 of the HSFI 220 transmits a first signal 111 through the signal transmission line 110-1 according to a control of the CPU 210, the receiver 311 of the DSFI 310 transmits the first signal 111, which may be, for example the SLEEP signal illustrated in FIG. 2, to the CPU 320 through the first transmission line 315.

According to one or more example embodiments of the inventive concepts, the DSFI 310 may include a function or hardware of transmitting the first signal 111 to the CPU 320 through the first transmission line 315, and transmitting a second signal 113, which may be, for example, the WAKEUP signal to the PMU 330 through a second transmission line 317. According to one or more example embodiments of the inventive concepts, the DSFI 310 may change (e.g., convert) the first signal 111 to data which may be interpreted by the CPU 320, and transmit the changed data to the CPU 320 through a corresponding transmission line. Even if the changed data is transmitted to the PMU 330 through a corresponding transmission line, the PMU 330 may not interpret the changed data. Therefore, the DSFI 310 may include a function or hardware of changing the first signal 111 to data.

The DSFI 310 may transmit the second signal 113 or WAKEUP signal, itself to the PMU 330 through a corresponding transmission line. Even if the second signal 113 or WAKEUP signal is transmitted to the CPU 320, the CPU 320 is in a power-off state. As a result, the CPU 320 may not operate in response to the second signal 113 or WAKEUP signal, and only the PMU 330 may operate in response to the second signal 113 or WAKEUP signal. Even if the CPU 320 is in a power-on state according to one or more example embodiments of the inventive concepts, the CPU 320 may not interpret the second signal 113 or WAKEUP signal.

The first signal 111 may be a signal which indicates an entry into a power saving mode or a sleep state. For example, the first signal 111 may be a signal for causing the storage device 300 to enter a power saving, idle and/or sleep state.

The CPU 320 interprets a first signal 111 and/or data related to the first signal 111, and transmits a control signal CTRL generated according to a result of the interpretation to the PMU 330. According to one or more example embodiments, the control signal CTRL may include one or more bits.

The PMU 330 may intercept a portion of a power PW2 supplied to the DSSI 340 in response to the control signal CTRL, and intercept each of powers PW3 and PWn supplied to each peripheral device 350 and 360. Therefore, the second interface 130 enters an L1 state and the data storage device 300 enters an idle state.

The power PW2 supplied to the DSSI 340 except at least one of the receiver 341 and the transmitter 342 in the L1 state or the idle state is intercepted by the PMU 330. That is, the power PW2 may be supplied to at least one of the receiver 341 and the transmitter 342 in the L1 state or the idle state.

The PMU 330 completely intercepts the power PW1 supplied to the CPU 320 and the power PW2 supplied to the DSSI 340 based on the control signal CTRL. Accordingly, the second interface 130 enters a PL1.2 state, and the data storage device 300 maintains the idle state. According to one or more example embodiments of the inventive concepts, the second interface 130 may be designed to enter from the L0 state to the PL1.2 state.

When the DSSI 340 is an interface which supports the PCIe, the DSSI 340 may include a physical layer, a data link layer, and a transaction layer.

A L1 state, as used in the present specification, may be defined as a state substantially the same as a L1.0 sub-state or a L1.1 sub-state described in "PCI-SIG ENGINEERING CHANGE NOTICE", and the PL1.2 state, a used in the present specification, may be defined as a state substantially the same as a L1.2 sub-state described in "PCI-SIG ENGINEERING CHANGE NOTICE".

That is, the data storage device 300 which supports the PCIe according to one or more example embodiments of the inventive concepts may use states substantially the same as states corresponding to L1 PM sub-states using the UART, the SMBus, or the GPIO without using a sideband signal referred to as CLKREQ# defined in "PCI-SIG ENGINEERING CHANGE NOTICE". Accordingly, the data storage device 300 which supports the PCIe may realize a power saving mode which reduces unnecessary power consumption.

According to one or more example embodiments of the inventive concepts, a peripheral device 350 or 360 may include a NAND flash memory and a controller circuit which controls an operation of the NAND flash memory. According to one or more example embodiments of the inventive concepts, the peripheral device 350 or 360 may include a dynamic random access memory (DRAM) and a controller circuit which controls an operation of the DRAM. According to one or more example embodiments of the inventive concepts, the peripheral device 350 or 360 may include a static random access memory (SRAM) and a controller circuit which controls an operation of the SRAM. According to one or more example embodiments of the inventive concepts, the peripheral device 350 or 360 may be the GPIO device.

That is, the peripheral device 350 or 360 may be embodied in hardware which performs various functions.

When the second interface 130 is in the PL1.2 state and the data storage device 300 is in the idle state, power of all configuration elements of the data storage device 300 except for the DSFI 310 and the PMU 330 is turned off. At this time, the power PW1 supplied to the CPU 320 is also turned off.

When the transmitter 221 of the HSFI 220 transmits the second signal 113 through the signal transmission line 110-1 according to a control of the CPU 210, the receiver 311 of the DSFI 310 transmits the second signal 113 to the PMU 330 through the second transmission line 317. The second signal 113 may be a signal which indicates an exit from the power saving mode or a wakeup. For example, the second signal 113 may be a signal for causing the storage device 300 to transition to a full power state or a higher power state from power saving, idle and/or sleep state.

The PMU 330 supplies the power PW2 to at least one of the receiver 341 and the transmitter 342 of the DSSI 340 according to the second signal 113 transmitted from the receiver 311 of the DSFI 310. The PMU 330 may supply the power PW2 to all of the DSSI 340 or supply at least one of the powers PW1, PW3, and PWn to the CPU 320 and at least one of the peripheral devices 350 and 360.

The second interface 130 enters from the PL1.2 state to the L1 state, and the data storage device 300 enters an active state. Thereafter, the second interface 130 enters from the L1 state to the L0 state. The host 200 and the data storage device 300 may normally transmit or receive an instruction and/or data to or from each other through the second interface 130, e.g., the PCIe, in the active state and the L0 state.

According to one or more example embodiments of the inventive concepts, the PMU 330 may cause a state of the second interface 130 to transition from the PL1.2 state to the L0 state based on the second signal 113. That is, a wakeup sequence of the CPU 320, the DSSI 340, and the peripheral devices 350 and 360 may be determined according to a manner in which the PMU 330 is designed.

Figure 3:
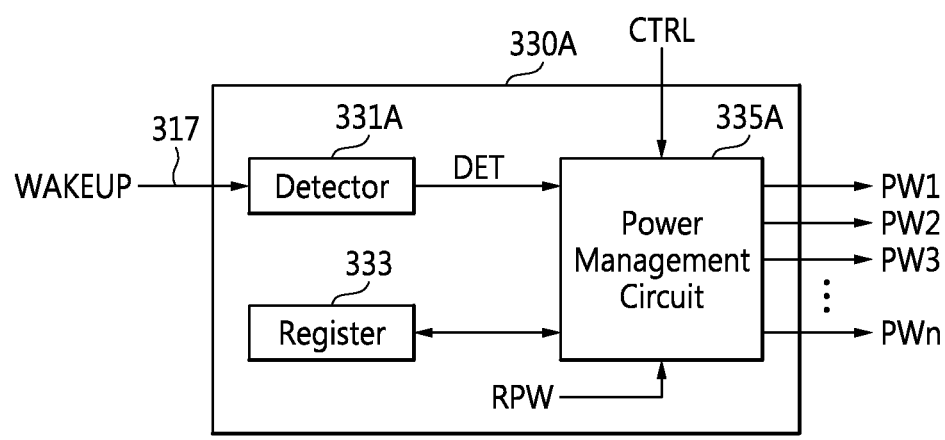
FIG. 3 is a schematic block diagram which depicts an example of a power management unit illustrated in FIG. 1A or 1B according to one or more example embodiments of the inventive concepts.
Figure 4:
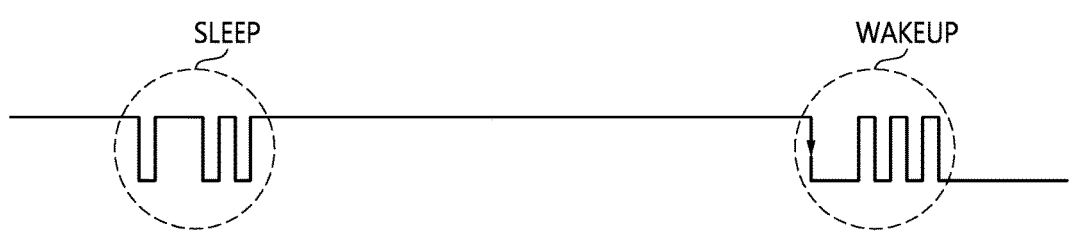
FIG. 4 is a waveform of a signal transmitted through a signal transmission line of a first interface.

FIG. 3 is a schematic block diagram which depicts an example a power management unit illustrated in FIG. 1A or 1B according to one or more example embodiments of the inventive concepts, and FIG. 4 is a waveform of a signal transmitted through a signal transmission line of a first interface.

Referring to FIGS. 3 and 4, according to one or more example embodiments of the inventive concepts a PMU 330A, which is an example of the PMU 300 of FIG. 1A or 1B, includes a detector 331A, a register 333, and a power control circuit 335A. The detector 331A may be, for example, a circuit.

The power control circuit 335A may generate each of the powers PW1, PW2, PW3, and PWn using a reference power RPW. For example, the reference power RPW may be a battery or a commercial voltage.

The power control circuit 335A may control a generation timing and/or a supply timing of each of the powers PW1, PW2, PW3, and PWn using a control signal CTRL output from the CPU 320 and values stored in the register 333. For example, when the CPU 320 generates a control signal CTRL based on a first signal SLEEP and/or data related to the first signal SLEEP, the power control circuit 335A may determine an off timing and/or an off sequence of each power PW1, PW2, PW3, and PWn using the control signal CTRL output from the CPU 320 and the values stored in the register 333.

Since the power PW1 supplied to the CPU 320 is turned off in the idle state, the control signal CTRL is inactivated. Accordingly, the CPU 320 may not operate in response to the second signal 113 or WAKEUP.

When the receiver 311 of the DSFI 310 receives the second signal 113 or WAKEUP through the signal transmission line 110-1, the second signal 113 or WAKEUP is input to the detector 331A through the second transmission line 317. The detector 331A detects a change in a first edge of the second signal WAKEUP, and outputs a detection signal DET according to a result of the detection. For example, the detector 331A may detect a first falling edge of the second signal WAKEUP and supply an activated detection signal DET to the power control circuit 335A.

The power control circuit 335A may determine the generation timing, the supply timing, and/or a supply sequence of each power PW1, PW2, PW3, and PWn by reading the values stored in the register 333 in response to the activated detection signal DET.

Figure 5:
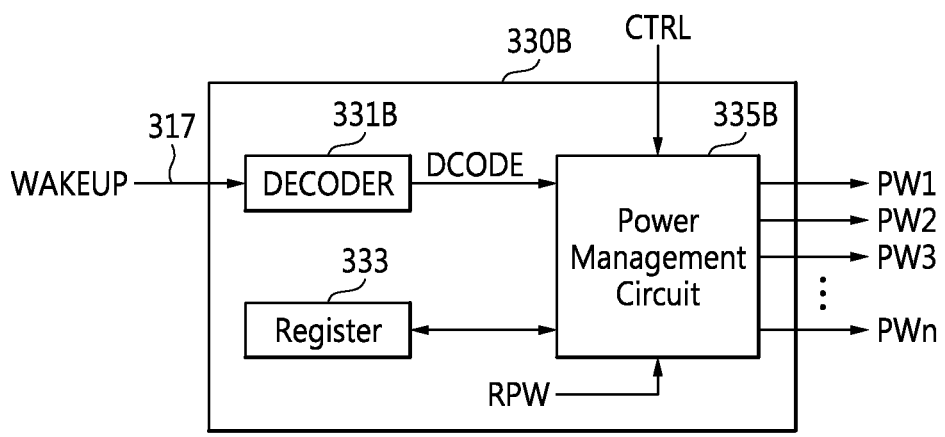
FIG. 5 is a schematic block diagram which depicts another example of the power management unit illustrated in FIG. 1A or 1B according to one or more example embodiments of the inventive concepts.

FIG. 5 is a schematic block diagram which depicts another example of the power management unit illustrated in FIG. 1A or 1B according to one or more example embodiments of the inventive concepts, and FIG. 6 is a table for describing an operation of the power management unit illustrated in FIG. 1A or 1B.

Referring to FIGS. 5 and 6, a PMU 330B according to one or more example embodiments of the inventive concepts of the PMU 300 of FIG. 1A or 1B includes a decoder 331B, the register 333, and a power control circuit 335B. The decodes 331B may be, for example, a circuit.

The power control circuit 335B may generate each of the powers PW1, PW2, PW3, and PWn using the reference power RPW. For example, the reference power RPW may be a battery or a commercial voltage. The power control circuit 335B may control the generation timing and/or the supply timing of each of the powers PW1, PW2, PW3, and PWn using the control signal CTRL output from the CPU 320 and the values stored in the register 333.

For example, when the CPU 320 generates the control signal CTRL based on a first signal SLEEP or data related to the first signal SLEEP, the power control circuit 335B may determine the off timing and/or the off sequence of each power PW1, PW2, PW3, and PWn using the control signal CTRL output from the CPU 320 and the values stored in the register 333.

Since the power PW1 supplied to the CPU 320 is turned off in the idle state, the control signal CTRL is inactivated.

When the receiver 311 of the DSFI 310 receives the second signal WAKEUP through the signal transmission line 110-1, the second signal WAKEUP is input to the decoder 331B through the second transmission line 317. The decoder 331B decodes the second signal WAKEUP and generates the decoded code DCODE. The power control circuit 335B may determine the generation timing, the supply timing, and/or the supply sequence of each power PW1, PW2, PW3, and PWn by reading the values stored in the register 333 in response to the decoded code DCODE.

For example, the second signal WAKEUP can be a specific data pattern indicating a control target. For example, when a decoded code DCODE decoded by the decoder 331B is a first code CODE1, the power control circuit 335B may supply the power PW1 to the CPU 320, and supply the power PW2 to the DSSI 340. At this time, a HSSI 230 may monitor a state of the receiver 232 and transmit a result of the monitoring to the CPU 210. According to a control of the CPU 210, the HSSI 230 may transmit or receive an instruction and/or data to or from the CPU 320 through the second interface 130 and the DSSI 340.

When the decode code DCODE decoded by the decoder 331B is a second code CODE2, the power control circuit 335B may supply the power PW2 to the DSSI 340, and supply a power PW3 to a peripheral device 350. At this time, the HSSI 230 may monitor a state of the receiver 232, and transmit a result of the monitoring to the CPU 210. According to a control of the CPU 210, the HSSI 230 may transmit or receive an instruction and/or data to or from the peripheral device 350 through the second interface 130 and the DSSI 340.

When the decoded code DCODE decoded by the decoder 331B is a third code CODE3, the power control circuit 335B may supply the power PW2 to the DSSI 340, supply the power PW3 to the peripheral device 350, and supply a power PWn to the peripheral device 360. At this time, the HSSI 230 may monitor a state of the receiver 232, and transmit a result of the monitoring to the CPU 210.

According to a control of the CPU 210, the HSSI 230 may transmit or receive an instruction and/or data to or from at least one of the peripheral devices 350 and 360 through the second interface 130 and the DSSI 340.

A table illustrated in FIG. 6 is provided as an example for convenience of description; however, one or more example embodiments are not limited thereto.

Figure 7:
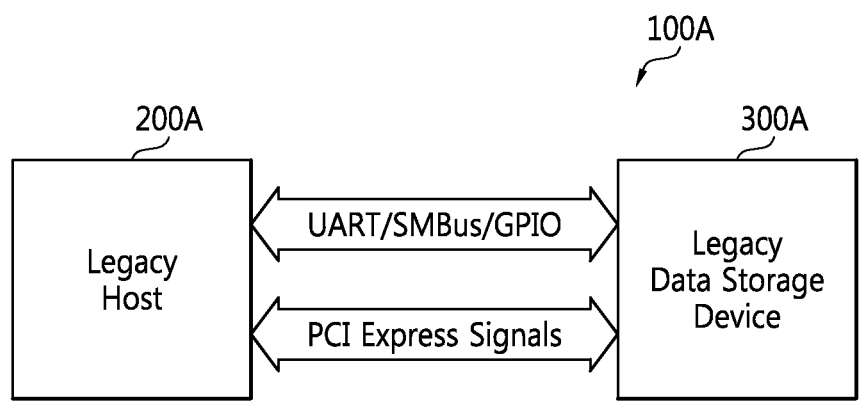
FIG. 7 is a diagram illustrating an example in which the data processing system illustrated in FIG. 1A or 1B is applied to a legacy system.

FIG. 7 is a diagram illustrating an example in which the data processing system illustrated in FIG. 1A or 1B is applied to a legacy system.

A data processing system 100A includes a legacy host 200A and a legacy data storage device 300A. As described referring to FIGS. 1A to 6, the legacy host 200A may control an entry into or an exit from the power saving mode of the legacy data storage device 300A using signals FIS related to the UART, the SMBus, or the GPIO without using a sideband signal, i.e., bidirectional open-drain request (CLKREQ#) signal.

FIG. 8 is a flowchart for describing an operation of the data processing system illustrated in FIG. 1A or 1B. Referring to FIGS. 1A to 8, when the data storage device 300 or 300A is in an active state, the host 200 or 200A transmits the first signal 111, i.e., a sleep mode entry signal SLEEP, to the CPU 320 through the first interface 110 and the DSFI 310 (S110).

The CPU 320 generates a control signal CTRL based on the first signal 111, i.e., the sleep mode entry signal SLEEP, and transmits the generated control signal CTRL to the PMU 330 (S120). The data storage device 300 or 300A enters a sleep mode, i.e., the idle state, according to a control of the PMU 330 (S130). That is, the PMU 330 supplies a power only to the DSFI 310 based on the control signal CTRL.

When the data storage device 300 or 300A is in the idle state, the host 200 or 200A transmits the second signal 113, i.e., a sleep mode exit signal WAKEUP, to the PMU 330 through the first interface 110 and the DSFI 310 (S140). The data storage device 300 or 300A enters a wakeup mode, i.e., an active state, according to a control of the PMU 330 (S150).

Thus, a data storage device 300 or 300A according to one or more example embodiments may enter and exit a low-power idle state, and interfaces of the data storage device 300 or 300A (e.g., the interface 130 and/or DSSI 340) may enter and exit a low-power L1 or PL1.2 state without using a per-link sideband signal like, for example, the bi-direction open drain clock request CLKREQ#.

A data storage device using a PCIe interface according to one or more example embodiments of the inventive concepts may embody the power saving mode corresponding to the L1 PM sub-states using another interface other than the PCIe interface even though the other interface may not support a sideband signal, i.e., CLKREQ#, which may be required by some systems to use certain power saving modes including the L1 PM sub-states.

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:
1. A data storage device comprising:
a central processing unit (CPU);
a peripheral device;
a power management unit (PMU) configured to control a power supply to the CPU and the peripheral device; and
a receiver configured to transmit a second signal to the PMU through a second transmission path after transmitting a first signal to the CPU through a first transmission path,
the receiver being configured such that the first and second signals transmitted by the receiver are signals that were output from a host,
the first signal being a sleep signal, which the CPU is configured to respond to by causing the data storage device to transition from a power-on state to a lower power state,
wherein,
the CPU is configured to generate a control signal based on the first signal and transmit the control signal to the PMU, and
the PMU is configured to intercept power supplied to the CPU and the peripheral device in response to the control signal.

2. The data storage device of claim 1, wherein,
the receiver is included in one of a universal asynchronous receiver/transmitter (UART), a system management bus (SMBus), and a general purpose input output (GPIO) device, and
the peripheral device is a high-speed serial interface.

3. The data storage device of claim 2, wherein the high-speed serial interface is a peripheral component interconnect express (PCIe) interface.

4. The data storage device of claim 1, wherein the PMU is configured to determine whether or not to supply power to at least one of the CPU and the peripheral device based on the second signal and a value stored in a register of the PMU.

5. The data storage device of claim 1, wherein the PMU is configured to determine whether or not to supply power to at least one of the CPU and the peripheral device based on a change in a first edge of a waveform of the second signal and a value stored in a register of the PMU.

6. The data storage device of claim 1, wherein the PMU is configured to decode the second signal and the PMU is configured to determine whether or not to supply power to at least one of the CPU and the peripheral device based on the decoded signal and a value stored in a register of the PMU.

7. A data processing system comprising:
a host;
a data storage device;
a first interface connected between the host and the data storage device; and
a second interface connected between the host and the data storage device,
wherein the data storage device is configured to enter an idle state, and the data storage device is configured to control the second interface such that a state of the second interface is a power-off state based on a first data packet, the first data packet being a data packet which is output from the host and input through the first interface, and
the data storage device is configured such that the data storage device transitions from the idle state to an active state, and the data storage device is configured to control the second interface such the state of the second interface is a power-on state based on a second data packet, the second data packet being a data packet which is output from the host and input through the first interface.

8. The data processing system according to claim 7, wherein the first interface is one of a universal asynchronous receiver/transmitter (UART), a system management bus (SMBus), and a general purpose input output (GPIO) device, and the second interface is a peripheral component interconnect express (PCIe) interface.

9. The data processing system of claim 7, wherein the data storage device includes:
a CPU;
a peripheral device;
a power management unit (PMU) configured to control a power supply to the CPU and the peripheral device; and
a receiver configured to transmit the second data packet to the PMU after transmitting the first data packet to the CPU.

10. The data processing system of claim 9, wherein
the CPU is configured to transmit a control signal to the PMU, and
the PMU is configured to intercepts power supplied to the CPU and the peripheral device in response to the control signal, the control signal transmitted by the CPU being generated based on the first data packet.

11. The data processing system of claim 10, wherein the PMU is configured to determine whether or not to supply power to at least one of the CPU and the peripheral device based on the second data packet and a value stored in a register of the PMU.

12. The data processing system of claim 10, wherein the PMU is configured to determine whether or not to supply power to at least one of the CPU and the peripheral device based on a change in a first edge of a waveform of the second data packet and a value stored in a register of the PMU.

13. The data processing system of claim 10, wherein the PMU is configured to decode the second data packet, and the PMU is configured to determine whether or not to supply power to at least one of the CPU and the peripheral device based on a decoded signal and a value stored in a register of the PMU.

14. A data processing system comprising:
a host;
a data storage device;
a first interface connected between the host and the data storage device; and
a second interface connected between the host and the data storage device,
the data storage device being configured to receive a first signal from the host through the first interface,
the data storage device being configured such that, based on receiving the first signal, the data storage device controls the second interface to transition from a power-on state to a lower power state, the lower power state being a state in which the second interface uses less power than the second interface uses when in the power-on state,
the data storage device being configured to receive a second signal from the host through the first interface,
the data storage device being configured such that, based on receiving the second signal, the data storage device controls the second interface to transition from the lower power state to the power-on state.

15. The data processing system of claim 14, wherein the first signal is not a sideband CLKREQ# signal.

* * * * *